United States Patent
Gindele et al.

(10) Patent No.: US 6,646,246 B1
(45) Date of Patent: Nov. 11, 2003

(54) METHOD AND SYSTEM OF NOISE REMOVAL FOR A SPARSELY SAMPLED EXTENDED DYNAMIC RANGE IMAGE SENSING DEVICE

(75) Inventors: Edward B. Gindele, Rochester, NY (US); Andrew C. Gallagher, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 347 days.

(21) Appl. No.: 09/718,882

(22) Filed: Nov. 21, 2000

(51) Int. Cl.$^7$ ................................. H04N 5/225
(52) U.S. Cl. .................. 250/208.1; 348/241; 348/242
(58) Field of Search ........................ 348/241, 607, 348/242, 256, 279; 250/208.1

(56) References Cited

U.S. PATENT DOCUMENTS

| | | |
|---|---|---|
| 3,971,065 A | 7/1976 | Bayer |
| 4,667,092 A | 5/1987 | Ishihara |
| 5,162,914 A * | 11/1992 | Takahashi et al. ....... 348/229.1 |
| 5,221,848 A | 6/1993 | Milch |
| 5,247,366 A * | 9/1993 | Ginosar et al. ............. 348/256 |
| 5,416,611 A | 5/1995 | Tandon |
| 5,652,621 A | 7/1997 | Adams, Jr. et al. |
| 6,040,858 A * | 3/2000 | Ikeda ......................... 348/242 |
| 6,480,226 B1 * | 11/2002 | Takahashi et al. .......... 348/296 |

FOREIGN PATENT DOCUMENTS

| | | |
|---|---|---|
| EP | 1 173 010 A2 | 1/2002 |
| WO | WO 00/13421 | 3/2000 |

OTHER PUBLICATIONS

Wang et al., Gradient Inverse Weighted Smoothing Scheme and the Evaluation of Its Performance, *Computer Graphics and Image Processing*, vol. 15, 1981, pp. 167–181.
Lee, Digital Image Smoothing and the Sigma Filter, Computer Vision, Graphics, and Image Processing 24, 1983, pp. 255–269.
U.S. Ser. No. 09/413,398 filed Oct. 6, 1999 by Gindele.
U.S. Ser. No. 09/415,365 filed Oct. 8, 1999 by Gindele.
U.S. Ser. No. 09/615,398 filed Jul. 13, 2000 by Gallagher et al.

* cited by examiner

*Primary Examiner*—Robert H. Kim
*Assistant Examiner*—Hoon Song
(74) *Attorney, Agent, or Firm*—Thomas H. Close (57) ABSTRACT

A method of removing noise from a sparsely sampled extended dynamic range image produced by a sparsely sampled extended dynamic range image sensing device having fast photosites with a predetermined response to a light exposure for producing fast pixel values and slow photosites with a slower response to the same light exposure for producing slow pixel values, includes the steps of: providing a sparsely sampled extended dynamic range digital image having fast and slow pixel values; using a noise filter method to remove noise from the sparsely sampled extended dynamic range digital image by using only slow pixel values to generate slow noise reduced pixel values and using only fast pixel values to generate fast noise reduced pixel values; and combining the slow noise reduced pixel values and the fast noise reduced pixel values to generate a noise reduced sparsely sampled digital image.

21 Claims, 8 Drawing Sheets

|   | x 0 | 1 | 2 | 3 |
|---|---|---|---|---|
| y 0 | g* | r | g* | r* |
| 1 | b* | g | b | g |
| 2 | g* | r* | g* | r |
| 3 | b | g | b* | g |

Fig. 7A

|   | x 0 | 1 | 2 | 3 |
|---|---|---|---|---|
| y 0 | * |   | * |   |
| 1 |   | * |   | * |
| 2 | * |   | * |   |
| 3 |   | * |   | * |

Fig. 8

METHOD AND SYSTEM OF NOISE REMOVAL FOR A SPARSELY SAMPLED EXTENDED DYNAMIC RANGE IMAGE SENSING DEVICE

FIELD OF THE INVENTION

The invention relates generally to the field of image capture, and more specifically to a method of removing noise from a sparsely sampled extended dynamic range digital image.

BACKGROUND OF THE INVENTION

Image sensing devices, such as a charge-coupled device (CCD) and CMOS image sensors, are commonly found in such products as digital cameras, scanners, and video cameras. These image sensing devices have a limited dynamic range when compared to traditional photographic film products. A typical electronic image sensing device has a dynamic range of about 7 stops. This means that the exposure for a typical scene must be determined with a fair amount of accuracy in order to avoid clipping the resultant signal. By contrast, natural scenes often exhibit a dynamic range of 9 stops and higher. This is mainly a consequence of multiple light sources with widely varying intensities illuminating the scene objects. Specular highlights also contribute to the dynamic range of natural scenes.

Electronic sensors used to scan photographic film must also contend with a high dynamic range of signal intensities. In U.S. Pat. No. 5,221,848 issued Jun. 22, 1993 to Milch entitled High Dynamic Range Film Digitizer and Method of Operating the Same discloses a method and apparatus designed to extend the dynamic range of an electronic image sensor. Aimed primarily for scanning photographic film, Milch teaches a method of a one pass film scanner using a charge-coupled device scanner having a plurality of linear arrays thereon. One of the arrays is responsive to high intensities of light and the other array is responsive to low intensities of light. The information from the two arrays is then combined and digitized forming an extended dynamic range digital image. The method and apparatus disclosed by Milch is an electronic image sensor having photosites with the same spectral sensitivity but different inherent response to intensities of light which is capable of producing digital images with very high dynamic range.

The noise present in signals produced by electronic image sensing devices can be removed with the application of a noise reduction algorithm. An example of noise reduction algorithm is the Sigma Filter, described by Jong-Sen Lee in the journal article "Digital Image Smoothing and the Sigma Filter", *Computer Vision, Graphics, and Image Processing*, Vol. 24, 1983, pp. 255–269. Lee discloses a noise reduction filter that uses a non-linear pixel averaging technique sampled from a rectangular window about the center pixel. Pixels in the local neighborhood are either included or excluded from the numerical average on the basis of the difference between the pixel and the center pixel. The Sigma Filter was designed for image processing applications for which the dominant noise source is Gaussian additive noise. Signal dependent noise sources can be incorporated by making noise reduction control parameters a function of the signal strength. However, for both signal independent and signal dependent noise cases the expected noise standard deviation must be known to obtain optimal results.

The Sigma noise reduction method described by Lee cannot be optimally applied directly to the signals produced by extended dynamic range electronic image sensing devices due to the fact that the noise characteristics of the different types of photosites have different noise characteristics. Therefore, there exists a need for an improved method of noise reduction for images produced by electronic image sensors capable of recording images with extended dynamic range.

SUMMARY OF THE INVENTION

The need is met according to the present invention by providing a method of removing noise from a sparsely sampled extended dynamic range image produced by a sparsely sampled extended dynamic range image sensing device having fast photosites with a predetermined response to a light exposure for producing fast pixel values and slow photosites with a slower response to the same light exposure for producing slow pixel values, that includes the steps of: providing a sparsely sampled extended dynamic range digital image having fast and slow pixel values; using a noise filter method to remove noise from the sparsely sampled extended dynamic range digital image by using only slow pixel values to generate slow noise reduced pixel values and using only fast pixel values to generate fast noise reduced pixel values; and combining the slow noise reduced pixel values and the fast noise reduced pixel values to generate a noise reduced sparsely sampled digital image.

ADVANTAGES

An important advantage of the present invention is the employment of a noise reduction method optimized for each type pixel relating to the different types of photosites employed by an extended dynamic range image sensing device.

Another important advantage of the present invention relates to the sequence of employing a noise removal processing step before employing an interpolation processing step. The processed digital images produced by the present invention have less noise than if the sequence of employing these two processing steps were reversed.

Still another important advantage of the present invention is the incorporation of a signal dependent noise reduction method which is used to optimize the noise reduction method for pixels of the image signal with different noise characteristics.

DETAILED DESCRIPTION OF THE INVENTION

A digital image is comprised of one or more digital image channels. Each digital image channel is comprised of a two-dimensional array of pixels. Each pixel value relates to the amount of light received by an imaging capture device corresponding to the geometrical domain of the pixel. For color imaging applications a digital image will typically consist of red, green, and blue digital image channels. Other configurations are also practiced, e.g. cyan, magenta, and yellow digital image channels. For monochrome applications, the digital image consists of one digital image channel. Motion imaging applications can be thought of as a time sequence of digital images. Those skilled in the art will recognize that the present invention can be applied to, but is not limited to, a digital image for any of the above mentioned applications.

Although the present invention describes a digital image channel as a two dimensional array of pixel values arranged by rows and columns, those skilled in the art will recognize that the present invention can be applied to mosaic (non rectilinear) arrays with equal effect.

Imaging devices employing electronic sensors are well known, therefore the present description will be directed in particular to elements forming part of, or cooperating more directly with, apparatus in accordance with the present invention. Elements not specifically shown or described herein may be selected from those known in the art. Note that as used herein, the term image is a two dimensional array of values. An image may be a two dimensional subset of another image. The present invention can be implemented using a programmed digital computer or custom integrated digital image processing circuitry. It is well within the skill of programming art to produce such a computer program based on the disclosure provided below. The computer can be a general purpose digital computer, such as a personal computer, or a special purpose digital computer specifically designed for processing digital images. The present invention can be implemented in whole or in part within a digital camera.

Figure 1:
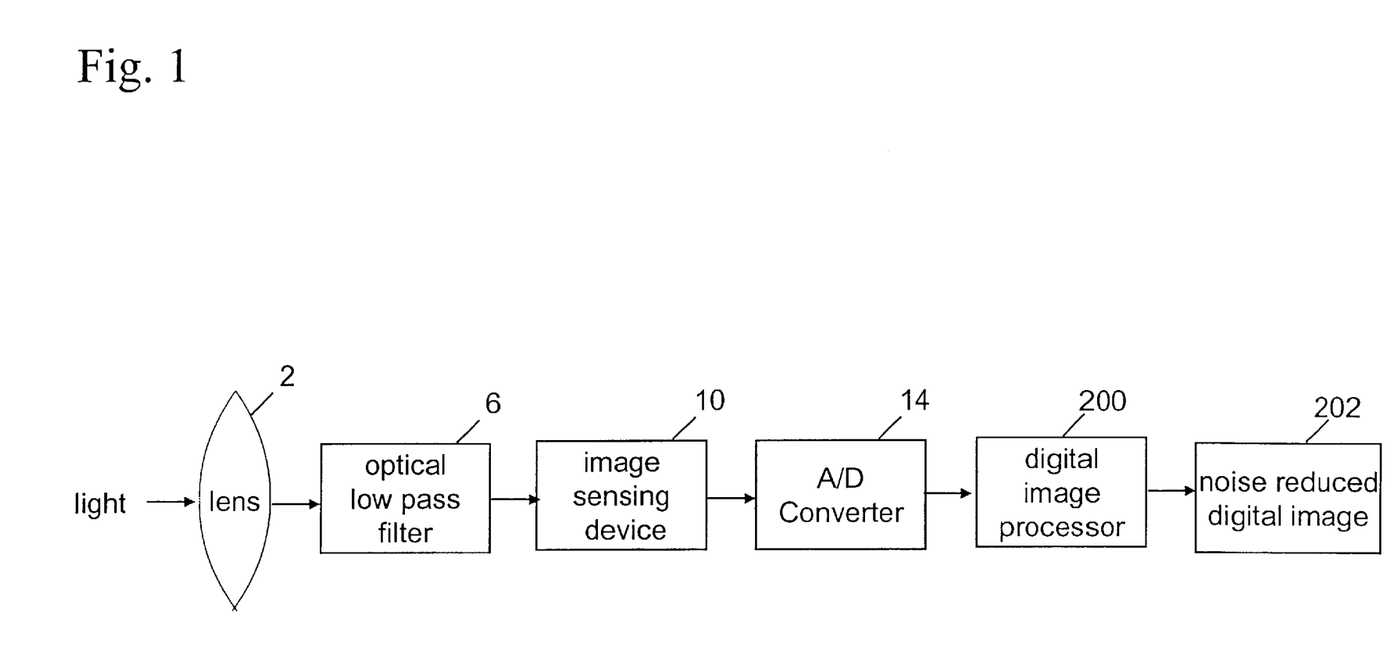
FIG. 1 is a block diagram of a digital imaging system utilizing an extended-range image sensing device and a digital image processor according to the invention.

The essential elements of the present invention are shown as a functional block diagram in FIG. 1. Light from an object or scene is incident upon a lens 2, forming a photographic image on the image sensing device 10 such as a charged-coupled device (CCD). Note that other devices, such as CMOS devices, may be used as the image sensing device 10. An optical low pass filter 6, placed between the lens 2 and the image sensing device 10 performs a slight blurring of the imaged light in order to reduce the occurrence of aliasing. An A/D converter 14 receives the voltage signal corresponding to the imaged light from the image sensing device 10 and produces an image signal corresponding to the voltage signal. The output of the A/D converter 14 is a sparsely sampled extended dynamic range digital image 201 (see FIG. 2). A sparsely sampled image is defined as an image that was captured with an image sensing device having a single image sensor with multiple types of photosites. According to the present invention, the term sparsely sampled is also intended to refer to an image produced by an image sensor having interspersed fast and slow photosites. Such an image will be referred to herein as a sparsely sampled extended dynamic range digital image. A sparsely sampled extended dynamic range digital image may also be produced by an image sensor having a color filter array and fast and slow photosites.

A digital image processor 200 receives the sparsely sampled extended dynamic range digital image 201 from the A/D converter 14 and applies a noise filter to the sparsely sampled extended dynamic range digital image 201 resulting in a noise reduced sparsely sampled extended dynamic range digital image. The noise reduced sparsely sampled extended dynamic range digital image is processed by the digital image processor 200 which generates a noise reduced digital image 202.

The A/D converter 14 shown in FIG. 1 converts the voltage signal produced by the image sensing device 10 into an image signal, i.e. a stream of digital pixel values corresponding to the voltage signal produced by the photosites of the image sensing device 10. More specifically, the A/D converter 14 converts the voltage signal, nearly linear with respect to the intensity of the incident light, from the image sensing device 10 to a discrete digital image signal, e.g. a 10 bit signal where the linear encoded values range from 0 to 1023. The A/D converter 14 may also perform processing to convert the linear code value domain image signal to a nonlinear code value domain image signal, such as an 8 bit logarithmic signal as is commonly performed in the art. For example, the following equation can be used to convert a 10 bit linear image signal a(x,y), where (x,y) specifies the row and column index of the signal location with reference to the image sensing device 10, into an 8 bit logarithmic image signal b(x,y):

$$b(x, y) = \begin{cases} 0 & 0 \le a(x, y) \le 31 \\ 73.5975 \ln a(x, y) - 255 & 32 \le a(x, y) \le 1024 \end{cases} \quad (1)$$

Note that each stop of exposure (in the linear response region of the image sensing device) results in a doubling of the linear image signal a(x,y) and results in an increase of the logarithmically encoded image signal b(x,y) by 51. In this case, the value 51 represents the number of code values per stop (cvs) of exposure.

Figure 2:
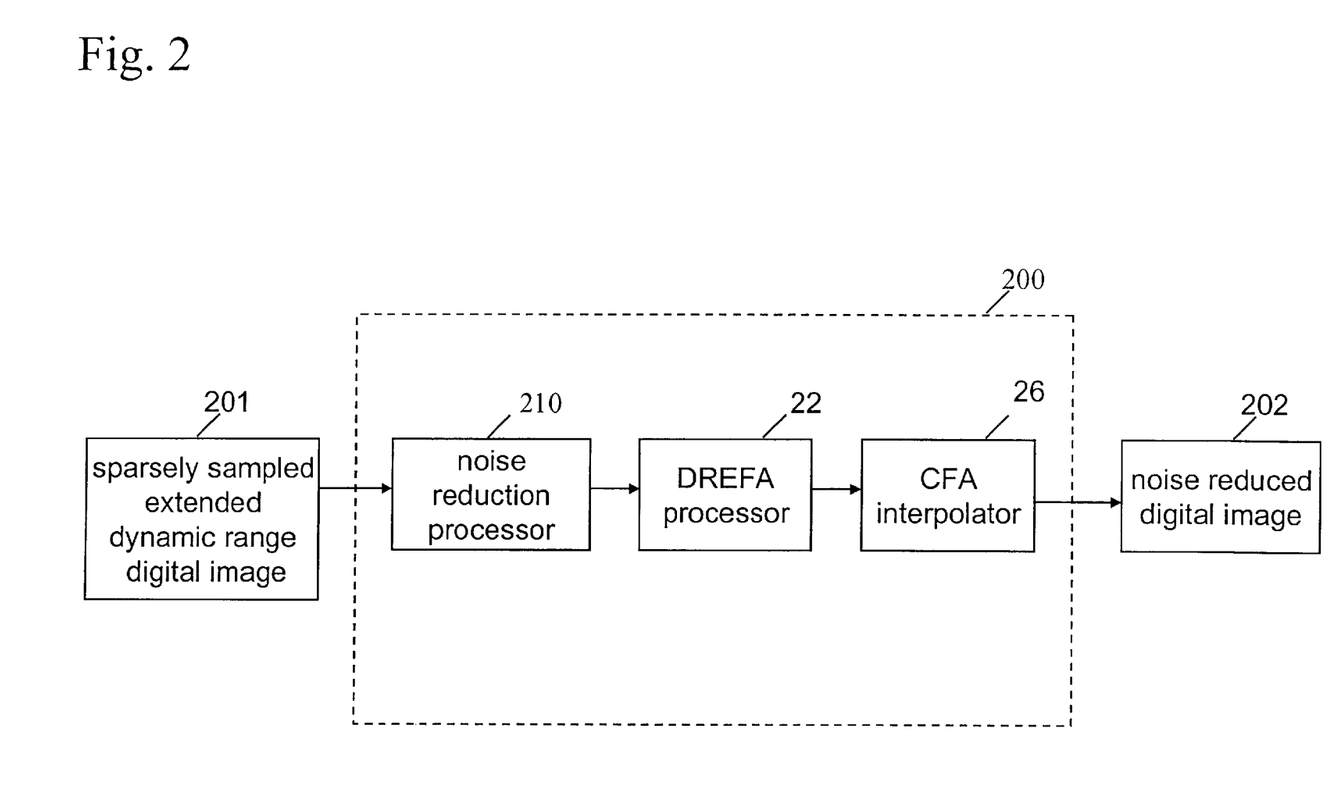
FIG. 2 is a functional block diagram of the digital image processor.

The digital image processor 200 shown in FIG. 1 is illustrated in more detail in FIG. 2. The image signal is received by the noise reduction module 210 in the form of the sparsely sampled extended dynamic range digital image 201 which applies a noise filter to the image signal to remove noise resulting in a noise reduced image signal in the form of a noise reduced sparsely sampled extended dynamic range digital image. The noise reduced sparsely sampled extended dynamic range digital image is received by the dynamic range extending filter array (DREFA) processor 22. The DREFA processor 22 processes the noise reduced image signal by expanding the dynamic range of the signal and interpolating the sample values. The DREFA processor 22 then transmits the modified noise reduced image signal to the CFA interpolator 26 where the color values are interpolated to provide a color value at each pixel. The output of the CFA interpolator 26 is a noise reduced digital image 202.

The purpose of the CFA interpolator 26 is to generate a full description of the color for each location of the sensed photographic image. In the preferred embodiment, the image sensing device 10 consists of an array of photosensitive elements called photosites. Each photosite is typically coated with either a red, green, or blue filter, as described in U.S. Pat. No. 3,971,065 issued Jul. 20, 1976 to Bayer entitled Color Imaging Array, which is incorporated herein by reference. The Bayer array is a color filter array in which green filters are located in a checkerboard pattern over the photosites with red and blue filter alternating line by line to fill the interstices of the checkerboard pattern; this produces twice as many green filter sites as either red or blue filter sites. Note that the method described herein may be easily extended to color filter arrays with different arrangements of the primaries, a different number of primaries, or a different set of primaries. Thus, in the preferred embodiment, each photosite is sensitive to either red, green, or blue light. However, it is desirable to obtain a pixel value corresponding to an exposure for each of the red, green, and blue exposures at each photosite location. The pixel values of the image signal constitute a sparsely sampled image having red, green, and blue pixel values at neighboring pixel locations. The CFA digital image is an example of a sparsely sampled digital image.

In this description, "red", "green", and "blue" represent the primary spectral sensitivities of an image sensing device 10, as is well known in the art of image processing. The CFA interpolator 26 generates from the image signal output from the A/D converter 14 an interpolated image signal consisting of a pixel value corresponding to the color primaries for each photosite. For example, if a particular photosite is coated with a red filter, then the A/D converter 14 outputs a red pixel value for that photosite since the red filter essentially blocks green and blue light from that particular photosite. The CFA interpolator 26 calculates a green pixel value and blue pixel value for the corresponding photosite even though the corresponding photosite does not respond to green and blue light. Similarly, the CFA interpolator 26 calculates a green pixel value and a red pixel value corresponding to the blue photosites, as well as a red pixel value and blue pixel value corresponding to the green photosites.

Generally, the CFA interpolator 26 operates by considering the pixel values of the corresponding photosite and the pixel values of associated surrounding photosites. While any commonly known interpolator may be used, a description of a preferred CFA interpolator is disclosed in U.S. Pat. No. 5,652,621 issued Jul. 29, 1997 to Adams, Jr. et al. entitled Adaptive Color Plane Interpolation in Single Sensor Color Electronic Camera, which is incorporated herein by reference. Adams et al. describe an apparatus for processing a digitized image signal obtained from an image sensor having color photosites aligned in rows and columns that generate at least three separate color values but only one color value for each photosite location, and a structure for interpolating color values for each photosite location so that it has three different color values. The apparatus generates an appropriate color value missing from a photosite location by the interpolation of an additional color value for such photosite locations from color values of different colors than the missing color value at nearby photosite locations. The apparatus also obtains Laplacian second-order values, gradient values and color difference bias values in at least two image directions from the pixel values corresponding to nearby photosites of the same column and row and selects a preferred orientation for the interpolation of the missing color value based upon a classifier developed from these values. Finally, the missing color pixel value from nearby multiple color pixel values is selected to agree with the preferred orientation.

The noise reduced image signal (noise reduced sparsely sampled extended dynamic range digital image) is received by the DREFA processor 22 which expands the dynamic range of the noise reduced image signal. In the preferred embodiment, the dynamic range of the image sensing device 10 is expanded by selecting certain photosites of the image sensing device 10 to have a slow response. The arrangement of the selected photosites with respect to the image sensing device 10 will be discussed in greater detail hereinbelow. In the preferred embodiment, the responses of selected photosites are slowed, or retarded, by altering the gain of the selected photosites, herein referred to as slow photosites. Altering the gain of a photosite is commonly practiced in the art of digital camera design and manufacture.

Figure 3:
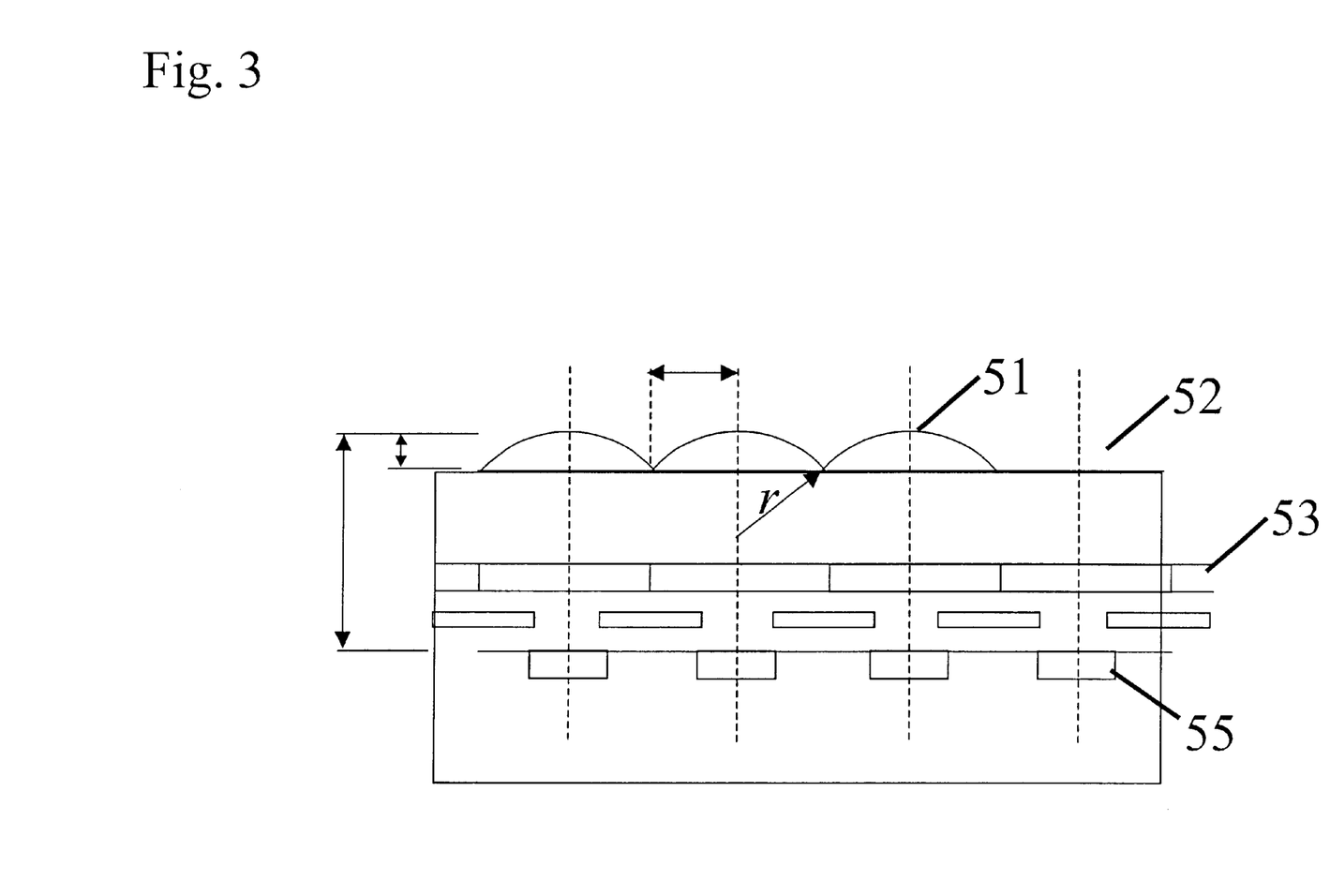
FIG. 3 is a cross-sectional view of an interline image sensor employing an array of lenslets to alter the response of selected photosites.

With reference to FIG. 3, it is a common practice in the art of image sensor manufacture to place resin lenslets 51 on top of each photosite. For example, particularly when the image sensing device 10 is an interline solid state image sensing device, one lenslet technique is described in U.S. Pat. No. 4,667,092 issued May 19, 1987 to Ishihara entitled Solid-State Image Device with Resin Lens and Resin Contact Layer which is incorporated herein by reference. Ishihara discloses a solid-state image device which includes an image storage block having a block surface and a plurality of storage elements are embedded along the block surface to store an image in the form of electric charge. An overlying layer is deposited to form an array of optical lenses in correspondence to the storage elements. An intermediate layer is laid between the block surface and the overlying layer. Incident light focuses through the lenses and the intermediate layer onto the storage elements. The intermediate layer serves as an adjusting layer for adjusting a focal length.

FIG. 3 shows a cross section of an interline solid state image sensing device. Without the lenslets 51, the signal readout area associated with each photosensitive area 55 of a photosite makes it impossible to use the whole area of the semiconductor substrate as the photoelectric transducer area. The conventional solid-state image device does not effectively utilize all incident rays thereon and therefore has low sensitivity. The addition of a resin lenslet 51 on top of a photosite allows the incident rays of light to be focused on the photoactive areas of the photosite, thereby more effectively utilizing the incident rays of light and increasing the sensitivity of the photosite. Thus, by varying the size and/or efficiency of the lenslet 51, the sensitivity (gain) of the photosite may be easily altered. Thus, for interline devices and for CMOS sensors, the preferred method of altering the gain of the photosite is by altering the lenslet 51 placed on top of the photosite. As shown in FIG. 3, the location 52 has no lenslet, and therefore fewer incident rays of light are incident with the photosensitive area. Alternatively, a lenslet could be manufactured at location 52 with a different radius, shape, size or material as compared with the lenslet 51, thereby structured to be less efficient at focusing incident rays of light onto the photosensitive area 55 than is the lenslet 51. Those skilled in the art will recognize that if the lenslet 51 focuses 80% of the incident rays of light onto a photosensitive area 55 and the location 52 having no lenslets (or alternatively slow lenslets) allows 20% of the incident rays of light onto a photosensitive area 55, then the photosite covered by lenslet 51 is 2 stops faster than the location 52. In this case, the lenslet 51 is used for fast photosites and no lenslet is used for slow photosites, as represented by location 52.

Figure 4:
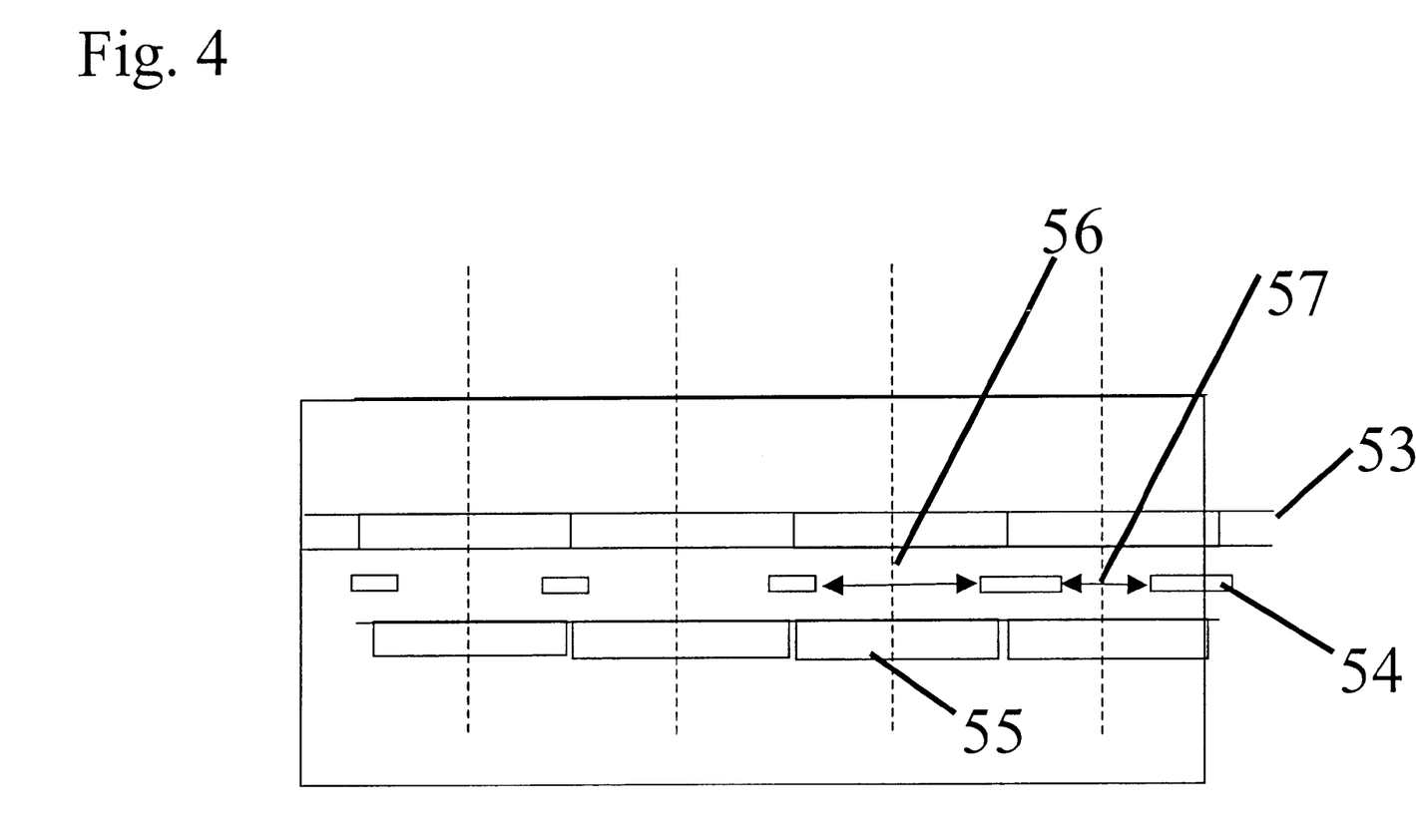
FIG. 4 is a cross-sectional view of a full frame image sensor employing a metal mask to alter the response of selected photosites.

With reference to FIG. 4 showing a cross section of a full frame image sensing device 10, in the case where the image sensing device 10 is a full frame device, light rays incident to the photosensitive area 55 of a photosite must pass through an aperture of a light shield, typically made from metal, which is shown in cross-section in FIG. 4 to comprise light blocking mask portions 54 and large and small apertures 56 and 57 interspersed among the light blocking portions. In the preferred embodiment, the gain of photosites may be altered by modifying the light blocking mask portion 54. The sensitivity of the photosite is then directly related to the aperture of the light blocking mask portion 54. For example, one photosite with an aperture 50% of the size of a second photosite's aperture will have a response of 50% compared to that on the second photosite. For example, a large aperture 56 of a light blocking mask portion 54 allows 80% of the light rays incident upon that photosite to pass through, but a small aperture 57 allows only 20% of the incident light rays to pass. Those skilled in the art will recognize that the photosite with the large aperture 56 is 2 stops faster than a photosite with the small aperture 57. In this case, the large aperture 56 is used for fast photosites, and the small aperture 57 is used for the slow photosites. Thus, the aperture of the light blocking mask may be modified to adjust the response of the selected photosites. The Eastman Kodak Company makes full frame image sensing devices with a metal mask light shield that reduces the pixel active area of all pixels from about 80% to about 20% (for dithered scanner applications where the sensor is moved by ½ the pixel spacing horizontally and vertical and 4 pictures are taken). The technique thus involves utilizing such mask technology, but with different sized apertures, to provide an image sensor with a differential response to image light.

Figure 5:
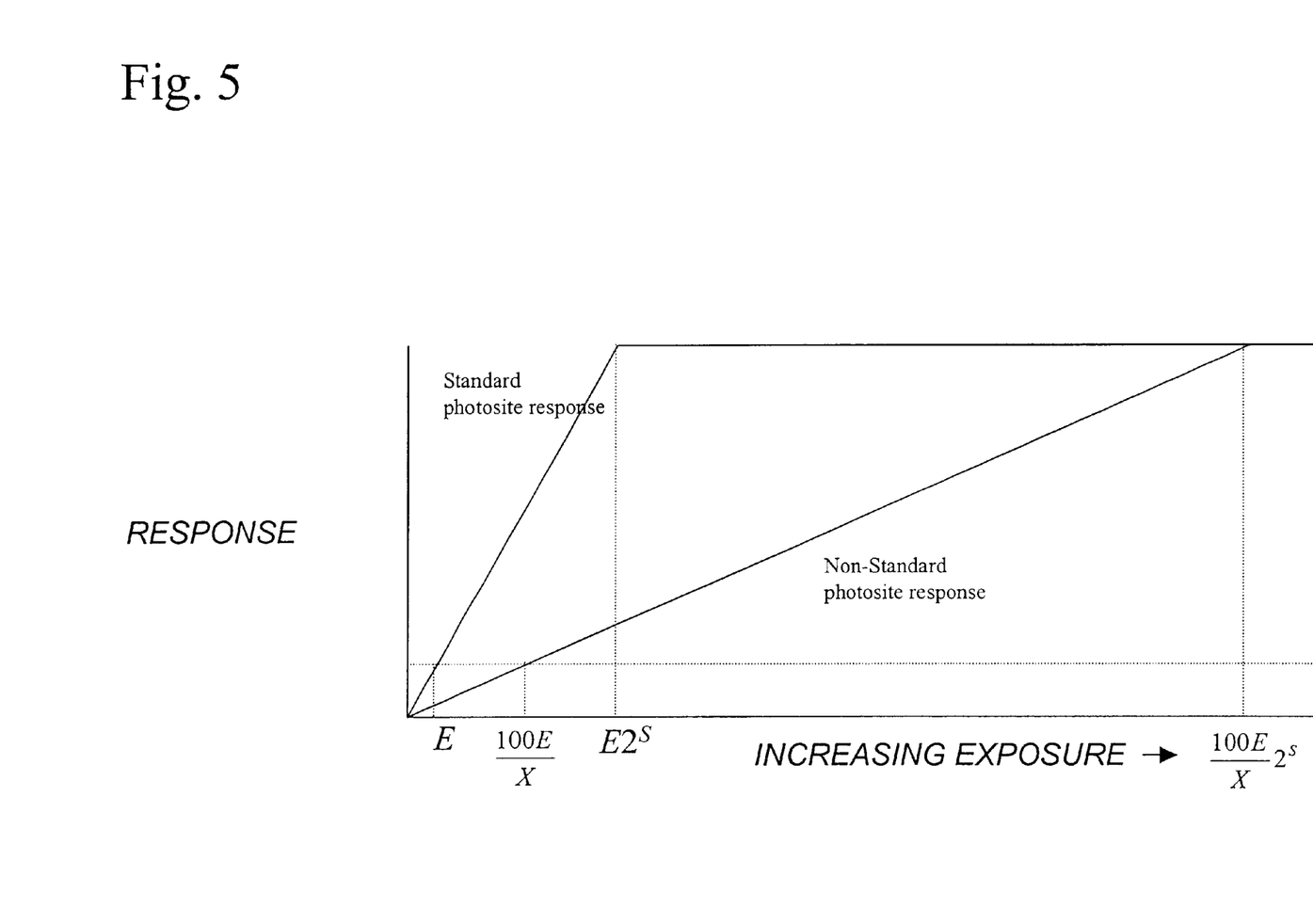
FIG. 5 is a graph illustrating the responses of a fast photosite and a slow photosite.

In the preferred embodiment, the response of the selected slow photosites is X % (where X<=100) that of fast photosites for the same exposure, as shown graphically in FIG. 5. In this preferred embodiment, the selected photosites have a response that is slowed by two stops (−log X/100) relative to the fast photosites, resulting in X=25. Thus, the image sensing device 10 consists of multiple sets of photosites, fast photosites and slow photosites. The collection of the output responses of the fast photosites constitutes a fast image, i.e. a sparsely sampled version of a scene sensed with the fast photosites. Likewise, the collection of the output responses of the slow photosites constitutes a slow image, i.e. a sparsely sampled version of a scene sensed with the slow photosites.

Figure 6:
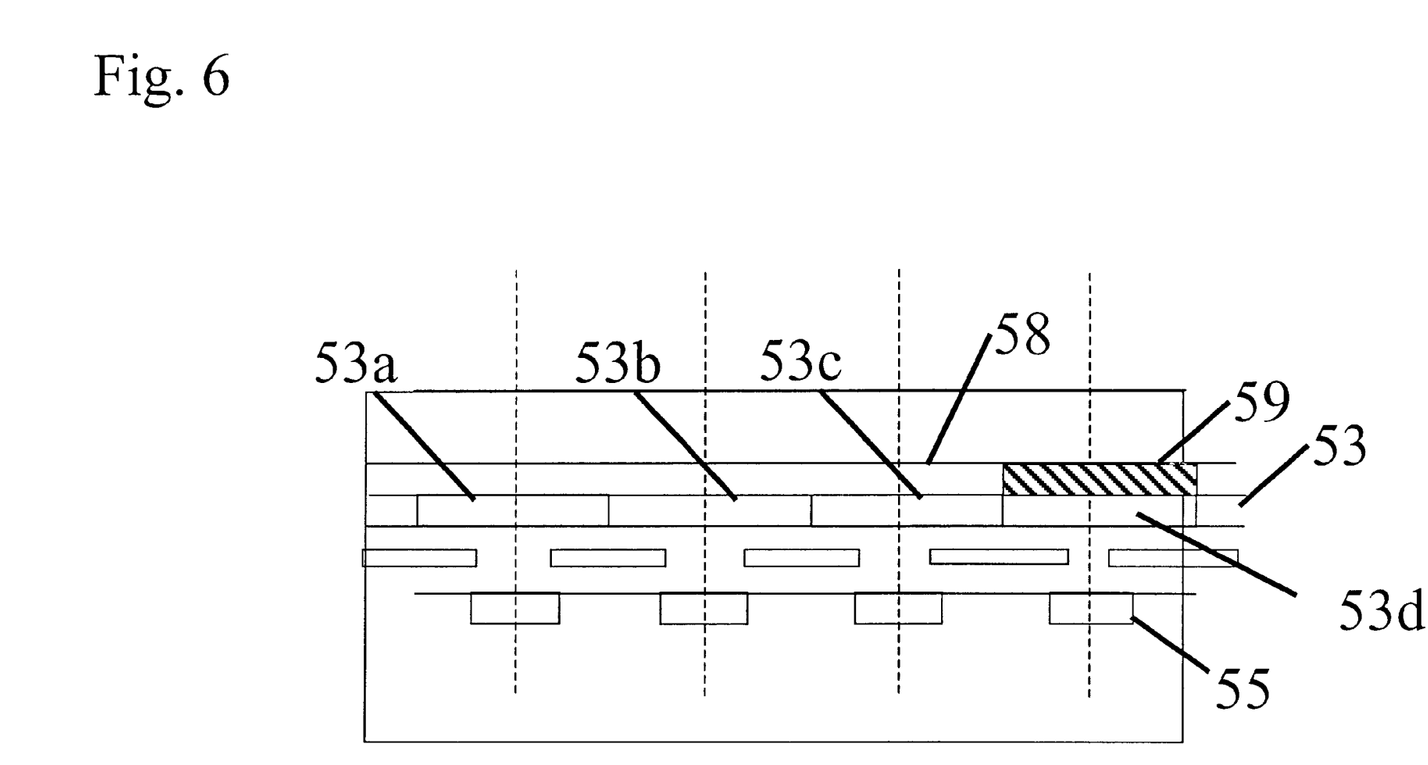
FIG. 6 is a cross-sectional view of an image sensor employing an array of neutral density filters used to alter the response of selected photosites.

As another alternative, the responses of the selected slow photosites can be slowed by the use of a neutral filter coating the photosite. FIG. 6 shows a cross section of an image sensing device with a color filter array 53. Note that the color filter array 53a is red, 53b is green, 53c is red, and 53d is green. A layer of neutral filters 58 is contained above the color filter array 53, although the position of the layer of neutral filters 58 and the color filter array 53 does not matter. Note that the layer of neutral filters 58 only contains a neutral filter at the positions of selected photosites, as indicated by the neutral filter 59. In this case, the layer of neutral filters 58 is transparent or nearly transparent for fast photosites and contains a neutral filter 59 for slow photosites. For example, if the neutral filter 59 consists of a material that allows X % transmission of light, then the response of that slow photosite will be slowed by $$-\log_2\left(\frac{X}{100}\right)$$

stops relative to the response of the fast photosite.

Figure 7A:
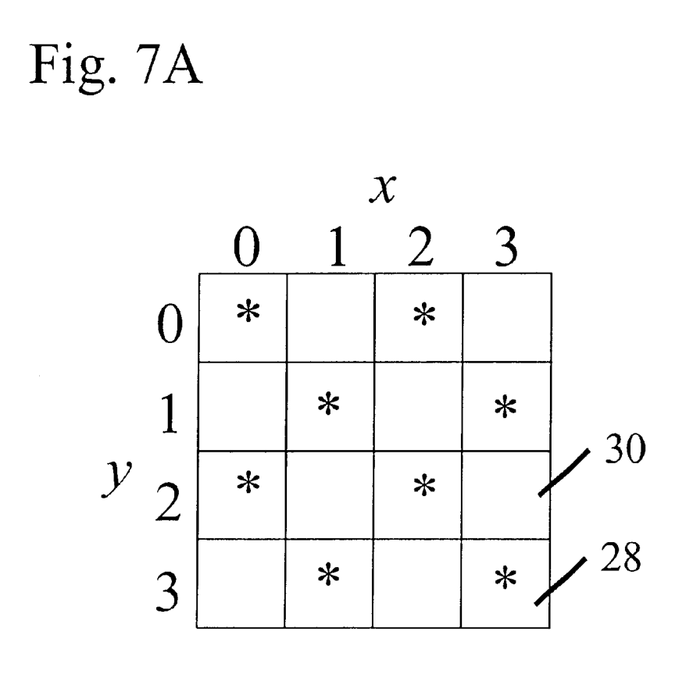
FIG. 7A illustrates the arrangement of slow photosites and fast photosites on a panchromatic image sensing device.

In the preferred embodiment, 50% of the photosites of the image sensing device 10 are selected to have slow response. Those skilled in the art will recognize that varying the percentage of photosites which have slow response will still result in the advantages of the present invention. In the case of an image sensing device 10 in which all photosites have approximately equivalent spectral sensitivity (i.e. a panchromatic image sensing device), FIG. 7A shows an arrangement of the slow photosites that will result in approximately 50% of all the photosites of the image sensing device 10 being of slow response. The photosites 28 with slow response are marked with an asterisk (*), while the photosites 30 having fast response are blank. A sparsely sampled digital image was previously defined as an image that was captured with an image sensing device having a color filter array. According to the present invention, the term sparsely sampled is also intended to refer to an image produced by an image sensor such as that shown in FIG. 7A where the fast and slow photosites are interspersed.

Figure 7B:
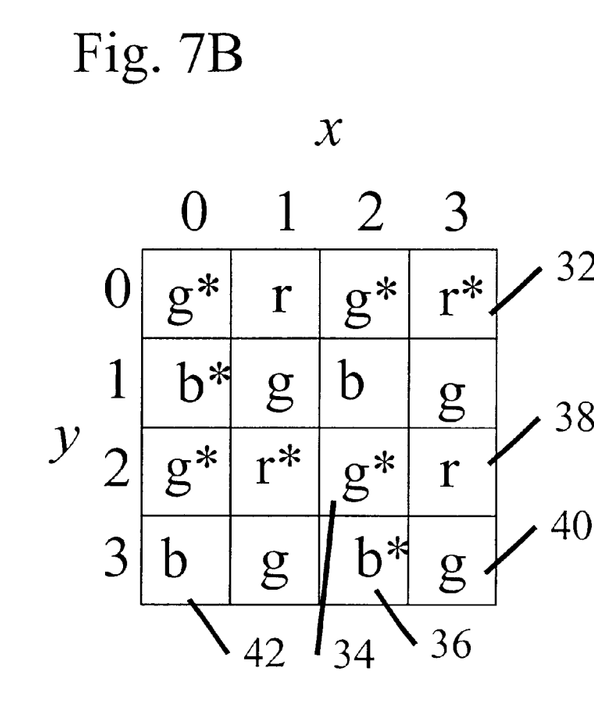
FIG. 7B illustrates the arrangement of slow photosites and fast photosites on a color image sensing device.

FIG. 7B shows an arrangement for a color image sensor wherein 50% of each photosite type (red, green, or blue sensitive) has slow response. For example, the photosites 32, 34, and 36 are red, green and blue photosites, respectively, having slow responses; the photosites 38, 40, and 42 are red, green and blue photosites, respectively, having fast responses.

Note that FIGS. 7A and 7B imply a regular pattern for the location of the slow photosites. While it is preferable that the slow photosites are arranged in a regular pattern, it is by no means necessary. The slow photosites could be arranged randomly or semi-randomly over the surface of the image sensing device 10.

Referring again to FIG. 5, the response of a fast photosite to a certain exposure and the response of a slow photosite to the same exposure are shown. Note that if a level of noise n is superimposed on the response, it can easily be seen that the fast photosite will yield a valid signal with lower exposures (beginning at exposure level E) than will the slow photosite $$\left(\text{which yields valid signal beginning at} \frac{100}{X}E.\right)$$

Alternatively, data from the slow photosite will be valid for higher exposure levels (up to signal level of $$\frac{100}{X}E2^s,$$

where S is the inherent dynamic range of a single photosite, typically S may be about 5 stops) than would the fast photosite (which produces valid response up to an exposure of $E2^s$). Note that both the fast photosite and the slow photosite have the same range of response in stops of exposure (S), but the response of the slow photosites is preferably $$-\log_2\left(\frac{X}{100}\right)$$

stops slower than the fast photosites, as shown in FIG. 5. It is preferred that the responses of the fast and slow photosites overlap with respect to exposure. That is, it is preferred that $$-\log_2\left(\frac{X}{100}\right) < S.$$

The overall dynamic range of the image sensing device 10, considering both fast and slow photosites, is $$S - \log_2\left(\frac{X}{100}\right).$$

In the case of the preferred embodiment, where S=5 and X=25, the overall effective dynamic range of the image sensing device 10 is 7 stops of exposure.

The DREFA processor 22 shown in FIG. 2 is described in more detail hereinbelow. The purpose of the DREFA processor 22 is to create an image signal with an increased dynamic range by processing the input noise reduced image signal while accounting for the difference in photo response of the fast and slow photosites. Accordingly, the output of the DREFA processor 22 is an expanded image signal having increased numerical dynamic range. This expanded image signal is then input to the CFA interpolator 26 for processing as previously described.

It is not a requirement of the present invention that the A/D converter 14, the noise reduction module 210, and the DREFA processor 22 be directly connected. The DREFA processor 22 may reside in hardware or software in close proximity to the A/D converter 14 and image sensing device 10. For example, the DREFA processor 22 could reside directly within a digital camera. However, the DREFA processor 22 may also be remote from the image sensing device 10. For example, the image signal output from the A/D converter 14 can be transmitted (after compression) via a wire or wireless connection to a personal computing device, printer, or remote server to apply to the operation of the noise reduction module 210 and DREFA processor 22. Transmission of the image signal may also include file transfer protocol or email. Additionally, payment via credit card or some other means may be required by the noise reduction module 210 and DREFA processor 22 from the user.

In the preferred embodiment, 50% of the photosites of the image sensing device 10 are selected to have slow response. Those skilled in the art will recognize that varying the percentage of photosites which have slow response will still result in the advantages of the present invention. In the case of an image sensing device 10 in which all photosites have approximately equivalent spectral sensitivity (i.e. a panchromatic image sensing device), FIG. 7A shows an arrangement of the slow photosites that will result in approximately 50% of all the photosites of the image sensing device 10 being of slow response. The photosites 28 with slow response are marked with an asterisk (*), while the photosites 30 having fast response are blank. A sparsely sampled digital image was previously defined as an image that was captured with an image sensing device having a color filter array. According to the present invention, the term sparsely sampled is also intended to refer to an image produced by an image sensor such as that shown in FIG. 7A where the fast and slow photosites are interspersed.

FIG. 7B shows an arrangement for a color image sensor wherein 50% of each photosite type (red, green, or blue sensitive) has slow response. For example, the photosites 32, 34, and 36 are red, green and blue photosites, respectively, having slow responses, the photosites 38, 40, and 42 are red, green and blue photosites, respectively, having fast response.

Note that FIGS. 7A and 7B imply a regular pattern for the location of the slow photosites. While it is preferable that the slow photosites are arranged in a regular pattern, it is by no means necessary. The slow photosites could be arranged randomly or semi-randomly over the surface of the image sensing device 10 and their location would be stored in some place accessible to the DREFA processor 22.

The DREFA processor 22 may be utilized to extend the overall dynamic range of the digital images produced with the present invention by using the pixel values corresponding to slow photosites to reconstruct the image signals in regions corresponding to very high exposures. Likewise, the DREFA processor 22 also uses the pixel values corresponding to photosites with fast response to reconstruct the image signal corresponding to very low exposures.

Figure 8:
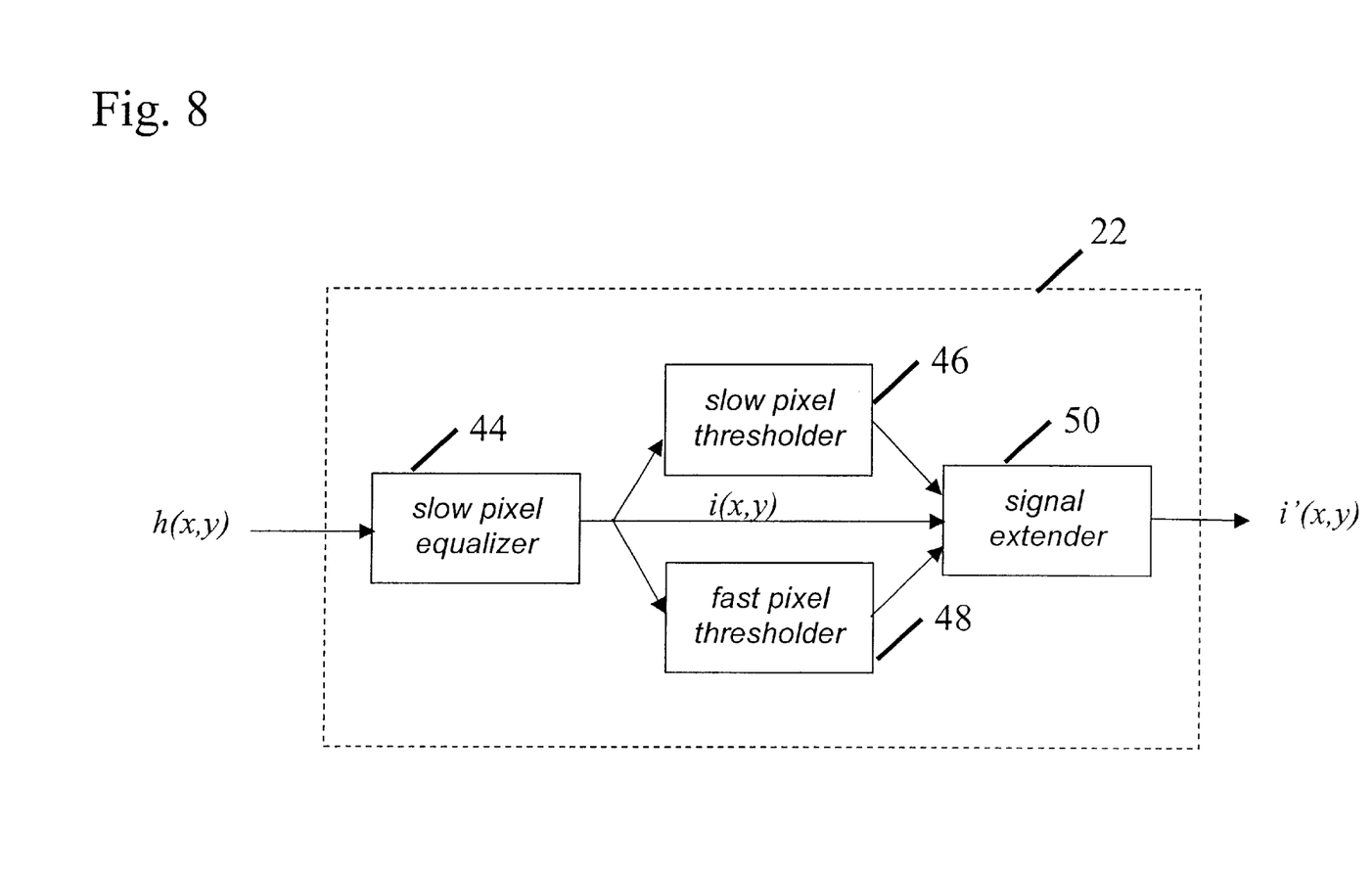
FIG. 8 is a block diagram of the dynamic range extending filter array (DREFA) processor.

FIG. 8 shows a block diagram of the DREFA processor 22. The logarithmic image signal b(x,y) output from the A/D converter 14 is passed to the slow pixel equalizer 44. The purpose of the slow pixel equalizer 44 is to compensate the image signal corresponding to slow photosites by accounting for the offset in response by X stops. Alternatively, the fast pixels can be equalized to the slow pixels by adjusting the fast pixels in the opposite direction. In the preferred embodiment, the image signal corresponding to the slow photosites are incremented by the quantity −cvs log(X/100), where cvs is the number of code values per stop of exposure. In the preferred embodiment, the quantity cvs is 51. Alternatively, if the image signal input to the slow pixel equalizer 44 is linearly related to exposure (rather than logarithmically), then the slow pixel equalizer 44 scales the image signal corresponding to the slow photosites by a factor of 100/X. Note that it is assumed that the locations of the slow photosites are known to the slow pixel equalizer 44. The output of the slow pixel equalizer 44 is an image signal i(x,y) that has been compensated at the locations of corresponding to slow photosites for the difference between the slow photosite response in relation to the fast photosite response. At the locations corresponding to fast photosites, the value of the image signal b(x,y) output from the A/D converter 14 is identical to the value of the image signal i(x,y) output from the slow pixel equalizer 44. Note that the image signal i(x,y) is not limited to an 8 bit range. In the preferred embodiment, the value of i(x,y) ranges from 0 to 357 (i.e. 9 bits).

Next, the image signal i(x,y) output from the slow pixel equalizer 44 is input to a slow pixel thresholder 46. The purpose of the slow pixel thresholder 46 is to determine slow pixel values that are of low quality due to a photosite not receiving enough photons to produce a valid signal. The pixel value at these (x,y) locations is then replaced in processing performed by the signal extender 50 by calculating a new pixel value based upon nearby fast pixel values. All slow pixel values which are less than a predetermined threshold are considered to be problem pixel values. In the case of the slow pixel values, this predetermined threshold is referred to as the low exposure response threshold. Thus, a pixel value i(x,y) is considered to be a problem if it is a slow photosite and if:

$$i(x,y) < T_1 \tag{2}$$

where $T_1$ is predetermined. In the preferred embodiment, the value of $T_1$ is given by $$T_1 = -cvs\log_2\left(\frac{X}{100}\right), \tag{3}$$

which in the preferred embodiment is set to a value of 102. Note that the threshold $T_1$ may be dependent upon the color sensitivity of the photosite at location (x,y). Slow pixel values that are problems are referred to as noise pixels, since the value of i(x,y) is not sufficiently above the noise level of the image sensing device to be useful.

Likewise, the image signal i(x,y) output from the slow pixel equalizer 44 is input to a fast pixel thresholder 48. The purpose of the fast pixel thresholder 48 is to determine fast pixels that are of low quality. The pixel values at these locations is then replaced by calculating a new pixel value based upon nearby slow pixel values in processing performed by the signal extender 50, which will be described in detail hereinbelow. All fast pixel values that are greater than a predetermined threshold value are considered to be problem pixels. In the case of the fast pixels, this predetermined threshold used for the purpose of detecting problem fast pixels is referred to as the high exposure response threshold. Thus, a fast pixel value i(x,y) is considered to be a problem if:

$$i(x,y) > T_2 \quad (4)$$

where $T_2$ is a predetermined threshold. In the preferred embodiment, the value of $T_2$ is set to a value of 254. Note that the threshold $T_2$ may be dependent upon the color of the photosite at location (x,y). Fast photosites that are problem locations are referred to as saturated pixels, since the value of i(x,y) is as high as possible at these locations.

The (x,y) locations of the problem slow pixels determined by the slow pixel thresholder 46 and the (x,y) locations of the problem fast pixels determined by the fast pixel thresholder 48 are input to the signal extender 50. In addition, the image signal i(x,y) output from the slow pixel equalizer 44 is also input to the signal extender 50. The purpose of the signal extender 50 is to replace the image signal i(x,y) values at problem locations (x,y) with estimates of the signal herein referred to as replacement values, had the inherent dynamic range of each photosite of the image sensing device 10 been greater. If the problem location is coincident with a slow photosite, then the replacement value is calculated from neighboring image signal pixel values coincident with fast photosites. In this embodiment, the term "neighboring" refers to a certain spatial distance. In the preferred embodiment, the photosites neighboring a selected photosites are those photosites within a distance of 2 photosites of the selected photosite. Likewise, if the problem location is coincident with a fast photosite, then the replacement value is calculated from neighboring image signal values coincident with slow photosites. In the preferred embodiment, the color of the photosite at the problem photosite is also taken into account. The replacement value for any problem location is preferably determined only by the signal originating from neighboring photosites of the same color. The output of the signal extender 50 is an image signal i'(x,y) having a dynamic range as if captured by an image sensing device 10 having photosites with inherent dynamic range of $$S = -\log_2\left(\frac{X}{100}\right) \quad (5)$$

rather than the actual inherent dynamic range of S for each photosite of the image sensing device 10. Note that for all (x,y) locations that are not problem locations, the value of i'(x,y) is equivalent to i(x,y).

As an example of the processing performed by the signal extender 50 for the Bayer CFA pattern shown in FIG. 7B, if location (x,y) is a problem location, and (x,y) is the location that corresponds to a green photosite (such as photosite 34 in FIG. 7B), then the replacement value i'(x,y) for the image signal i(x,y) is calculated in the following manner:

$$i'(x,y)=0.25*[i(x-1,y-1)+i(x+1,y-1)+i(x-1,y+1)+i(x+1,y+1)] \quad (6)$$

Note that signal values that the calculation of i'(x,y) is dependent upon, are expected to comply with certain requirements. For example, suppose that (x,y) is a problem location and (x,y) corresponds to a green photosite with slow response. Then the signal levels of neighboring photosites are used to calculate replacement value i'(x,y). However, this assumes that the signal values of each of the neighboring photosites are also less than $T_3$. In the preferred embodiment, $T_3=T_1$. For each neighboring photosite that this is not the case, that signal level is omitted from the calculation of the replacement value i'(x,y). For example, if i(x-1, y-1)>$T_3$, then the value i'(x,y) is calculated with the following formula:

$$i'(x,y)=\frac{1}{3}*[i(x+1,y-1)+i(x-1,y+1)+i(x+1,y+1)] \quad (7)$$

Generally, the interpolation scheme for determining a replacement value at problem location (x,y), where the location (x,y) corresponds to a green photosite which is also a fast photosite on a image sensing device having a Bayer pattern filter array is given with the following equation:

$$i'(x,y) = \frac{\sum_{j=-1,k=-1,1} i(x+j, y+k)W(x+j, y+k)}{\sum_{j=-1,k=-1,1} W(x+j, y+k)} \quad (8)$$

where $$W(x+j, y+k) = \begin{cases} 1 & i(x+j, y+k) > T_3 \\ 0 & \text{otherwise} \end{cases} \quad (9)$$

Note that the same equation is applied to determine the replacement value if the problem location corresponds to a green photosite which is also a slow photosite. However, in this case:

$$W(x+j, y+k) = \begin{cases} 1 & i(x+j, y+k) > T_4 \\ 0 & \text{otherwise} \end{cases}, \quad (10)$$

where in the preferred embodiment, $T_4=T_2$.

As another example, also in connection with the Bayer CFA pattern shown in FIG. 7B, if location i(x,y) is a problem photosite and (x,y) corresponds to a location of a red or blue photosite, then the replacement value i'(x,y) for the image signal i(x,y) is calculated in the following manner:

$$i'(x,y)=0.25*[i(x-2,y)+i(x+2,y)+i(x,y+2)+i(x,y-2)]. \quad (11)$$

When location (x,y) corresponds to a red or blue photosite and is also a fast photosite, the equation for determining the replacement value i'(x,y) may be generalized as follows:

$$i'(x,y) = \frac{\sum_{j=-2,0,2} \sum_{k=-2,0,2} i(x+j, y+k)W(x+j, y+k)}{\sum_{j=-2,0,2} \sum_{k=-2,0,2} W(x+j, y+k)} \quad (12)$$

where $$W(x+j, y+k) = \begin{cases} 1 & i(x+j, y+k) > T_3 \\ 0 & \text{otherwise} \end{cases} \quad (13)$$

Note that in this case, either j or k must be 0, but j and k are never both zero. Note also that the same equation is applied to determine the replacement value if the problem location corresponds to a red or blue photosite which is also a slow photosite. However, in this case $$W(x+j, y+k) = \begin{cases} 1 & i(x+j, y+k) < T_4 \\ 0 & \text{otherwise} \end{cases}, \quad (14)$$

where in the preferred embodiment, $T_4=T_2$.

The interpolation scheme described above for the purpose of generating an image signal with an extended dynamic range from more than one sparsely sampled image signal may be modified by those skilled in the art. However, many such modifications to the above interpolation scheme may be derived and should not be considered as significant deviations of the present invention.

Those skilled in the art will recognize that the above interpolation scheme performed by the signal extender is a lowpass filter, which is well known in the art. Typically, the application of a lowpass filter to a image signal has a similar effect to reducing the resolution of the image signal. Thus, the processing performed by the DREFA processor 22 is a method by which the spatial resolution of the image sensing device 10 may be traded for dynamic range of the image sensing device 10. Indeed, those areas of an image where the interpolation scheme is implemented to increase the dynamic range of the signal appear noticeably softer (less sharp) than the image would have if that same area of the image had been captured by the sensor in such a fashion that no "problem locations" (as defined by the slow pixel thresholder 46 and the fast pixel thresholder 48) occur.

The present invention employs a noise reduction processor 210 to remove noise from the image signal before employing the DREFA processor 22 and CFA interpolator 26 to the image signal. The noise removal processing prior to the interpolation processing is an important advantage of the present invention. In particular, interpolation processing can amplify the noise present in the image signal. Therefore, employing the noise removal processing before interpolation results in processed digital images with less noise than if the sequence of employing these two processing modules were reversed. Another important aspect of the present invention is the incorporation of a signal dependent noise reduction method which is used to optimize the noise reduction method for pixels of the image signal with different noise characteristics.

The preferred embodiment of the present invention uses a modified version of the Sigma filter, described by Jong-Sen Lee in the journal article *Digital Image Smoothing and the Sigma Filter*, referenced above, to remove noise from the image signal. The values of the pixels contained in a local neighborhood of pixels, n by n pixels where n denotes the length of pixels in either the row or column direction, are compared with the value of the center pixel, or pixel of interest. Each pixel in the local neighborhood of pixels is given a weighting factor of one or zero based on the absolute difference between the value of the pixel of interest and the local neighborhood pixel value. If the absolute value of the pixel value difference is less or equal to a threshold $\epsilon$, the weighting factor is set to one. Otherwise, the weighting factor is set to zero. The numerical constant $\epsilon$ is set to two times the expected noise standard deviation. Mathematically the expression for the calculation of the noise reduced pixel value is given as $$q_{ij} = \Sigma_{mn}\, \delta_{mnij}\, a_{mn}\, p_{mn} / \Sigma_{mn}\, \delta_{mnij}\, a_{mn} \quad (15)$$

and $a_{mn}=1$ if $|p_{mn}-p_{ij}|<=\epsilon$ $a_{mn}=0$ if $|p_{mn}-p_{ij}|>\epsilon$ where $p_{mn}$ represents the mn$^{th}$ pixel contained in the local neighborhood of pixels, $p_{ij}$ represents the value of the pixel of interest located at row i and column j, $a_{mn}$ represents a weighting factor, $q_{ij}$ represents the noise reduced pixel value, and $\epsilon$ represents a threshold variable of the noise reduction filter. The variable $\delta_{mnij}$ is a factor that is either 0.0 or 1.0 depending on the type of the corresponding photosites associated with the center pixel $p_{ij}$ and the pixel $p_{mn}$. For example, if the pixels $p_{ij}$ and $p_{mn}$ both correspond to the same type of photosite, i.e. with the same spectral sensitivity to light and the same response to the magnitude of light, the value of $\delta_{mnij}$ is 1.0. If the pixels $p_{ij}$ and $p_{mn}$ correspond the to photosites which have a different spectral sensitivity to light or a different response to the magnitude of light, the value of $\delta_{mnij}$ is 0.0. Thus the noise reduced pixel value $q_{ij}$ is calculated from pixel values in a small local neighborhood of pixels which have the same noise characteristics. Thus according to the present invention, only pixels corresponding to slow photosites are employed in the calculation of the noise reduced pixel values for pixels corresponding to slow photosites. Similarly, only pixels corresponding to fast photosites are employed in the calculation of the noise reduced pixel values for pixels corresponding to fast photosites.

In general, the noise characteristics of the of the different types of photosites of the image sensing device 10 are different, i.e. if two photosites differ either in their spectral response to light or in absolute intensity of light their noise characteristics will be different. The signal dependent noise feature of the present invention is incorporated into the expression for $\epsilon$ given by equation (16).

$$\epsilon = Sfac\; \sigma_n(p_{ij}) \quad (16)$$

where $\sigma_n$ represents the noise standard deviation of the image signal evaluated at the center pixel value $p_{ij}$ (i.e. the pixel of interest). The parameter Sfac can be used to vary the degree of noise reduction. Both the Sfac and $\epsilon$ variables are examples of a noise adjustment parameter. The calculation of the noise reduced pixel value $q_{ij}$ as the division of the two sums is then calculated. The process is completed for all of the pixels contained in the image signal. The noise reduced pixel values replace the image signal pixel values.

The sigma filter as described by Lee is one example of a pixel difference filter that can be used in the present invention. The central aspect of a pixel difference filter is a spatial filter that calculates a noise reduced pixel value based on the pixel values in a local neighborhood of pixels about a pixel of interest, wherein the influence of each local pixel is based on the difference between the local pixel value and a reference numerical value derived from the pixels in the local neighborhood. The preferred embodiment of the present invention uses the value of the pixel of interest as the reference numerical value. Other values such as the average of pixels in the local neighborhood can also be used as the reference numerical value.

Another example of a pixel difference filter is the Inverse Gradient Filter described by D. C. C. Wang et al. in their published paper *Gradient Inverse Weighted Smoothing Scheme and the Evaluation of its Performance*, Computer Graphics and Image Processing Vol. 15, p. 167–181, 1981. This algorithm produces a noise reduced image by taking a non-linear weighting of the local pixel values from a rectangular sampling region about the center pixel. The weighting factor is based on the magnitude difference between the center pixel and the surrounding pixel value.

The present invention can be practiced with noise reduction methods that do not rely on the noise characteristics of the image signal. In an alternative embodiment of the present invention a median filter is used to calculate the noise reduced pixel values. As with the preferred embodiment, this alternative embodiment uses only pixels corresponding to slow photosites to calculate the noise reduced pixel values for pixels corresponding to slow photosites and only pixels corresponding to fast photosites to calculate the noise reduced pixel values for pixels corresponding to fast photosites.

The present invention uses separate noise characterization tables for the slow pixel values and fast pixel values corresponding to the slow photosites and fast photosites respectively. Table (1) is an example of a noise characteristic table that could be used for either the slow pixels or fast pixels. In practicing the present invention, different noise tables can be used for the slow pixels and the fast pixels. The standard deviation variable $\sigma_n$ ( ) of equation (16) assumes different values for the red, green, and blue pixels. It is also possible to practice the present invention with a noise characteristic table with only one entry for each of the pixel types. This is the signal independent case.

TABLE 1

| average pixel value | Standard deviation of red pixels | Standard deviation of green pixels | Standard deviation of blue pixels |
|---|---|---|---|
| 16 | 3.28 | 3.62 | 3.21 |
| 48 | 3.71 | 3.20 | 3.38 |
| 80 | 3.77 | 4.14 | 4.50 |
| 112 | 4.57 | 4.35 | 4.21 |
| 144 | 4.98 | 4.25 | 4.37 |
| 176 | 5.05 | 4.11 | 6.21 |
| 208 | 5.05 | 5.64 | 6.29 |
| 240 | 2.71 | 4.27 | 3.87 |

Those skilled in the art will recognize that the present invention can be practiced with other noise reduction methods which can require a characterization other than a table of a standard deviation values.

The invention has been described in detail with particular reference to certain preferred embodiments thereof, but it will be understood that variations and modifications can be effected within the spirit and scope of the invention.

PARTS LIST 2 lens
6 optical lowpass filter
10 image sensing device
14 A/D converter
22 DREFA processor
26 CFA interpolator
28 slow photosite
30 fast photosite
32 red slow photosite
34 green slow photosite
36 blue slow photosite
38 red fast photosite
40 green fast photosite
42 blue fast photosite
44 slow pixel equalizer
46 slow pixel thresholder
48 fast pixel thresholder
50 signal extender
51 lenslet
52 slow photosite location
53a–d color filter array
54 light blocking mask portion
55 photosensitive area
56 large aperture
57 small aperture
58 layer of neutral filters
59 neutral filter
200 digital image processor
201 sparsely sampled extended dynamic range digital image
202 noise reduced digital image
210 noise reduction processor

What is claimed is:

1. A method of removing noise from a sparsely sampled extended dynamic range image produced by a sparsely sampled extended dynamic range image sensing device having fast photosites with a predetermined response to a light exposure for producing fast pixel values and slow photosites with a slower response to the same light exposure for producing slow pixel values, comprising the steps of:

a) providing a sparsely sampled extended dynamic range digital image having fast and slow pixel values;

b) using a noise filter method to remove noise from the sparsely sampled extended dynamic range digital image by using only slow pixel values to generate slow noise reduced pixel values and using only fast pixel values to generate fast noise reduced pixel values; and c) combining the slow noise reduced pixel values and the fast noise reduced pixel values to generate a noise reduced sparsely sampled digital image.

2. The method of claim 1 wherein the noise filter method includes the steps of:

identifying a pixel of interest and a local neighborhood of pixels located about the pixel of interest;

calculating a difference pixel value for pixels in the local neighborhood of pixels based on the absolute difference between the value of the pixel of interest and the individual values of pixels included in the local neighborhood of pixels; and using the absolute difference pixel values to calculate a noise reduced pixel value.

3. The method of claim 2, wherein the step of using the absolute difference pixel values, further includes the steps of:

comparing the absolute difference pixel values to a threshold value; and using only the values of pixels included in the local neighborhood of pixels for which the corresponding absolute difference pixel values are less than the threshold value to calculate the noise reduced pixel value.

4. The method of claim 3, wherein the threshold value is determined by:

providing a table of two or more noise characteristic values;

using the values of pixels in the local neighborhood of pixels to select one of the noise characteristic values; and using the selected noise characteristic value as the threshold value.

5. The method of claim 4, wherein different tables of noise characteristic values are provided for the slow pixel values and the fast pixel values.

6. The method of claim 5, wherein the sparsely sampled extended dynamic range digital image includes red, green, and blue slow pixel values and red, green, and blue fast pixel values and wherein different tables of noise characteristic values are provided respectively for the red slow, green slow and blue slow pixel values and the red fast, green fast and blue fast pixel values.

7. The method of claim 1 wherein the noise filter method employs a median filter.

8. The method of claim 1, further comprising the step of:

d) expanding the dynamic range of the noise reduced fast and slow pixel values in the noise reduced sparsely sampled digital image.

9. The method of claim 8, wherein the sparsely sampled extended dynamic range digital image includes red, green and blue slow pixel values and red, green and blue fast pixel values, and further including the step of:

using an interpolation spatial filter to generate missing pixel values to produce a noise reduced digital image.

10. A system for removing noise from a sparsely sampled extended dynamic range image produced by a sparsely sampled extended dynamic range image sensing device having fast photosites with a predetermined response to a light exposure for producing fast pixel values and slow photosites with a slower response to the same light exposure for producing slow pixel values, comprising:

a) means for providing a sparsely sampled extended dynamic range digital image having fast and slow pixel values;

b) a noise filter for removing noise from the sparsely sampled extended dynamic range digital image by using only slow pixel values to generate slow noise reduced pixel values and using only fast pixel values to generate fast noise reduced pixel values; and c) means for combining the slow noise reduced pixel values and the fast noise reduced pixel values to generate a noise reduced sparsely sampled digital image.

11. The system of claim 10 wherein the noise filter includes:

means for identifying a pixel of interest and a local neighborhood of pixels located about the pixel of interest;

means for calculating a difference pixel value for pixels in the local neighborhood of pixels based on the absolute difference between the value of the pixel of interest and the individual values of pixels included in the local neighborhood of pixels; and means for using the absolute difference pixel values to calculate a noise reduced pixel value.

12. The system of claim 11, wherein the means for using the absolute difference pixel values, further includes:

means for comparing the absolute difference pixel values to a threshold value; and means for using only the values of pixels included in the local neighborhood of pixels for which the corresponding absolute difference pixel values are less than the threshold value to calculate the noise reduced pixel value.

13. The system of claim 12, further comprising means for determining the threshold value comprising:

a table of two or more noise characteristic values;

means for using the values of pixels in the local neighborhood of pixels to select one of the noise characteristic values; and means for using the selected noise characteristic value as the threshold value.

14. The system of claim 13, including different tables of noise characteristic values for the slow pixel values and the fast pixel values.

15. The system of claim 14, wherein the sparsely sampled extended dynamic range digital image includes red, green and blue slow pixel values and red, green and blue fast pixel values and including different tables of noise characteristic values respectively for the red slow, green slow and blue slow pixel values and the red fast, green fast and blue fast pixel values.

16. The system of claim 10 wherein the noise filter includes a median filter.

17. The system of claim 10, further comprising:

d) means for expanding the dynamic range of the noise reduced fast and slow pixel values in the noise reduced sparsely sampled digital image.

18. The system of claim 17, wherein the sparsely sampled extended dynamic range digital image includes red, green and blue slow pixel values and red, green and blue fast pixel values, and further including:

an interpolation spatial filter for generating missing pixel values to produce a noise reduced digital image.

19. A computer program product for performing the method of claim 1.

20. A digital image produced by the method of claim 1.

21. The method of claim 1, wherein the method is performed in a digital camera.

* * * * *